(12) United States Patent
Owen

(10) Patent No.: US 11,364,967 B1
(45) Date of Patent: Jun. 21, 2022

(54) FOLDABLE SCOOTER

(71) Applicant: Anita Wu, Dongguan (CN)

(72) Inventor: Neil Owen, Dongguan (CN)

(73) Assignee: Anita Wu, Dongguan (CN)

( * ) Notice: Subject to any disclaimer, the term of this patent is extended or adjusted under 35 U.S.C. 154(b) by 23 days.

(21) Appl. No.: 17/143,335

(22) Filed: Jan. 7, 2021

(51) Int. Cl.
*B62K 15/00* (2006.01)
*B62K 3/00* (2006.01)

(52) U.S. Cl.
CPC ............ *B62K 15/006* (2013.01); *B62K 3/002* (2013.01)

(58) Field of Classification Search
CPC ............................... B62K 3/002; B62K 15/006
See application file for complete search history.

(56) References Cited

U.S. PATENT DOCUMENTS

| | | | | |
|---|---|---|---|---|
| 6,450,517 B1 * | 9/2002 | Lee | ........................ | B62K 3/002 280/87.041 |
| 7,419,171 B1 * | 9/2008 | Ka Ming | ............. | B62K 15/006 403/96 |
| 8,292,018 B2 * | 10/2012 | Huang | ................... | B62K 3/002 180/220 |
| 10,407,119 B1 * | 9/2019 | Greenberg | ........... | B62K 15/008 |
| 2009/0230648 A1 * | 9/2009 | Chan | ...................... | B62K 3/002 280/87.041 |
| 2018/0186424 A1 * | 7/2018 | Sung | ...................... | B62K 3/002 |

FOREIGN PATENT DOCUMENTS

| | | | | |
|---|---|---|---|---|
| TW | M553293 U | * | 12/2017 | |
| WO | WO-2009097074 A1 | * | 8/2009 | ......... A63C 17/0093 |
| WO | WO-2020035839 A1 | * | 2/2020 | |

* cited by examiner

*Primary Examiner* — Katy M Ebner
(74) *Attorney, Agent, or Firm* — Muncy, Geissler, Olds & Lowe, P.C.

(57) ABSTRACT

A foldable scooter includes a folding control mechanism between a deck assembly and a steering assembly. The folding control mechanism includes a lever which is freely rotatable between a first position and a second position so as to provide an idling rotation stroke. During the idling rotation stroke, the lever does not unlock the folding control mechanism, and the lever unlocks the folding control mechanism when the lever keeps rotating to be over the idling rotation stroke.

20 Claims, 9 Drawing Sheets

FOLDABLE SCOOTER

BACKGROUND OF THE INVENTION

Field of the Invention

The present invention relates to a foldable scooter.

Description of the Prior Art

Scooter is another type of sporting product different form the skateboard. A scooter usually includes a deck assembly, a steering assembly, a front wheel and a rear wheel. The steering assembly can operate to control the front wheel to make a turn or the like. Although the scooter is relatively smaller than a bicycle, there is still a need for folding the scooter.

The conventional folding scooter usually uses a wire or rope in its folding control mechanism, so the overall structure is not compact, easy to damage, and difficult to control.

The present invention is, therefore, arisen to obviate or at least mitigate the above-mentioned disadvantages.

SUMMARY OF THE INVENTION

The main object of the present invention is to provide a foldable scooter which has a compact structure, and is easy and reliable to fold.

To achieve the above and other objects, the present invention provides a foldable scooter, including: a deck assembly and a steering assembly; the steering assembly including a steering rod, a head tube sleeved around the steering rod and a bracket, the deck assembly including a deck body and a connector connected to a front end of the deck body, the bracket being connected between the head tube and the connector; the connector including at least one guiding groove, each of the at least one guiding groove including an unfolding positioning slot and a folding positioning slot which are arranged in interval; a slidable member being slidably disposed in the bracket, at least one engaging portion being disposed on the slidable member, slidable along the at least one guiding groove and releasably blocked within the unfolding positioning slot or releasably blocked within the folding positioning slot, the foldable scooter further including a linkage mechanism connected to the bracket, connected with the slidable member and configured to release the at least one engaging portion from the unfolding positioning slot or the folding positioning slot; the linkage mechanism including a lever, a driving member and a linking member, the driving member and the linking member being connected to the bracket, the lever being located at a side of the bracket facing toward a rear end of the deck body; the driving member including a driving portion, a connecting portion and a lever mounting portion, the driving portion being connected with the linking member, the linking member being connected with the slidable member; the connecting portion being connected to the bracket by a second shaft, the lever being rotatably connected to the lever mounting portion, the lever being freely rotatable relative to the driving member between a first position and a second position so as to provide an idling rotation stroke of the lever; the lever including an abutting portion abutable against the driving member on a rotation direction of the lever to drive the driving member; wherein when the lever is located in the first position, the lever is adjacent to the bracket and the abutting portion is distanced from the driving member in the rotation direction of the lever and the at least one engaging portion is releasably blocked within the unfolding positioning slot or releasably blocked within the folding positioning slot; when the lever is rotated away from the bracket from the first position to be located in the second position, the lever is abutted against the driving member in the rotation direction of the lever and the driving member is driven to move by the lever as the lever is rotated away from the bracket from the second position, and the at least one engaging portion is released from the unfolding positioning slot or released from the folding positioning slot.

The foldable scooter of the present is provided with a linkage mechanism but not a wire control mechanism, so it has a compact structure, and is easy and reliable to fold. The lever is provided with idling rotation stroke (about 30 degrees) to prevent unintended folding due to unintended releasing of the folding control mechanism by kicking of a foot. For example, the foldable scooter would not be folded if a user unintendedly moves the lever within the idling rotation stroke. The folding of the foldable scooter can be carried out by operating the lever with a foot, which is very convenient.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
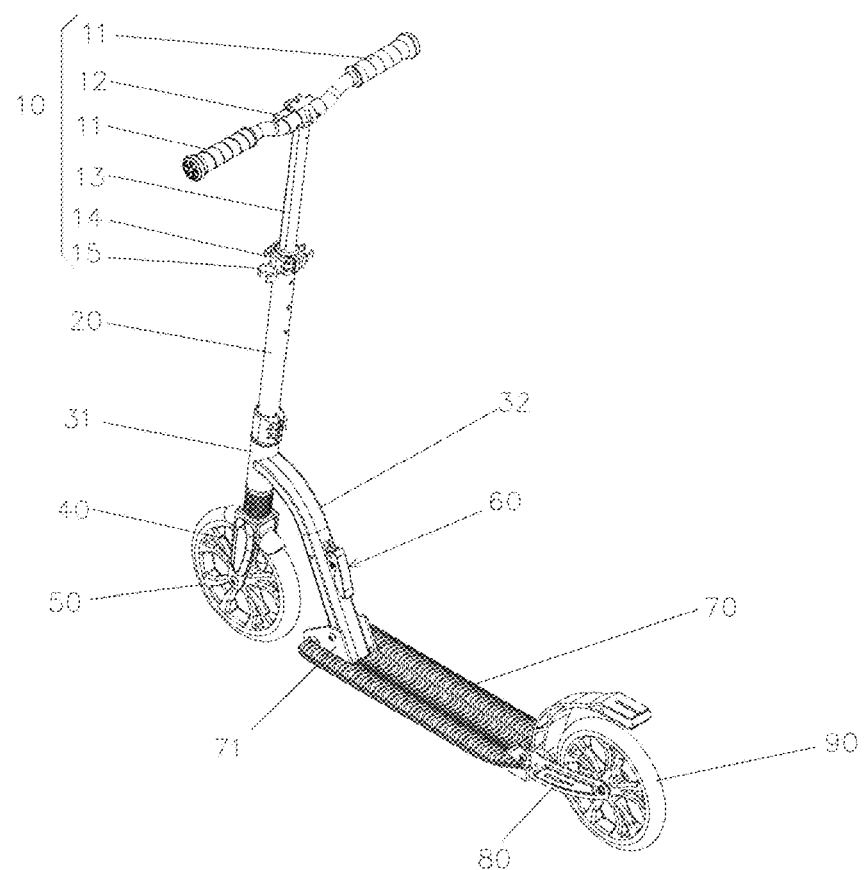
FIG. 1 is a stereogram of a preferable embodiment of the present invention.
Figure 2:
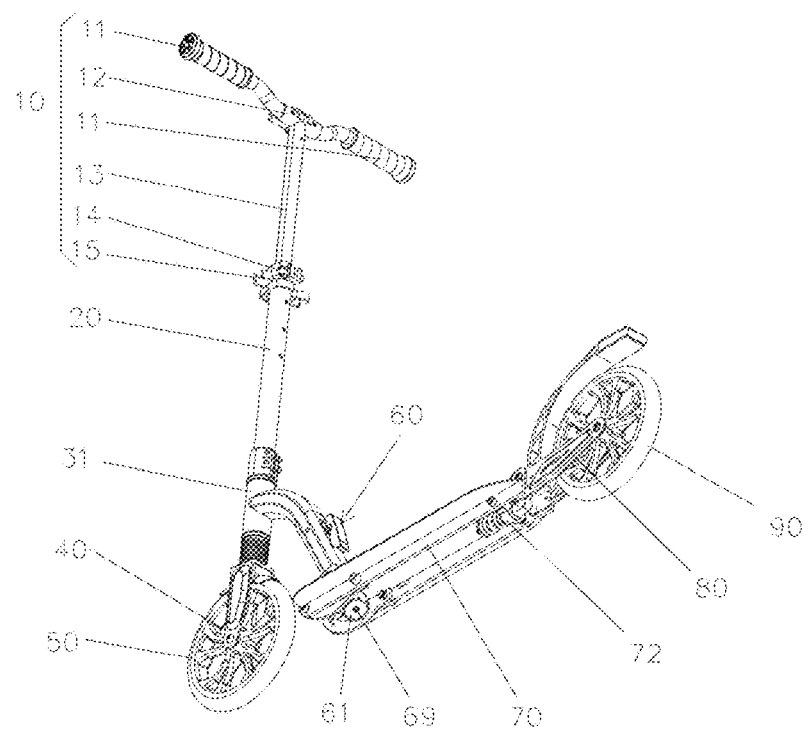
FIG. 2 is another stereogram of a preferable embodiment of the present invention.

Please refer to FIGS. 1 to 2 for a preferable embodiment of the present invention. A foldable scooter of the present invention includes a deck assembly, a steering assembly, a front wheel 50, a rear wheel 90 and a folding control mechanism 60. The rear wheel 90 is mounted to the deck assembly. The steering assembly controls the front wheel to make a turn. The folding control mechanism 60 is disposed between the deck assembly and the steering assembly and configured for controlling folding/unfolding of the steering assembly relative to the deck assembly.

Specifically, the steering assembly includes a handle assembly 10, a steering rod 20, a head tube 31, a bracket 32 and a wheel mounting mechanism 40 (such as a fork). The front wheel 50 is rotatably mounted to the wheel mounting mechanism 40, and the wheel mounting mechanism 40 is connected with the steering rod 20. The steering rod 20 is disposed through the head tube 31 and rotatable relative to the head tube 31, and relative axial movement of the steering rod 20 and the head tube 31 is limited. The handle assembly 10 is connected to an upper portion of the steering rod 20. The bracket 32 is fixedly connected or integrally formed with the head tube 31, and the bracket 32 is connected to the deck assembly.

The deck assembly includes a deck body 70, a connector connected to a front end of the deck body 70, a shock absorbing mechanism 72 and a wheel mounting mechanism 80. The connector includes two plates 71 separately and oppositely connected to the front end of the deck body 70. Each of the two plates 71 includes one guiding groove 712 and a first shaft hole 711. Each of two sides of the bracket 32 includes a second shaft hole 321, and a first shaft 75 is disposed through each said first shaft hole 711 and each said second shaft hole 321 to connect the bracket 32 and the deck assembly. The wheel mounting mechanism 80 is mounted to the rear end of the deck body 70, and the shock absorbing mechanism 72 is disposed between the wheel mounting mechanism 80 and the deck body 70. The rear wheel 90 is rotatably mounted to the wheel mounting mechanism 80. It is noted that the lever 62 is located at a side 323 of the bracket 32 facing toward a rear end of the deck body 70 so that the lever 62 can be driven, for example, by one foot, which is convenient.

Figure 3:
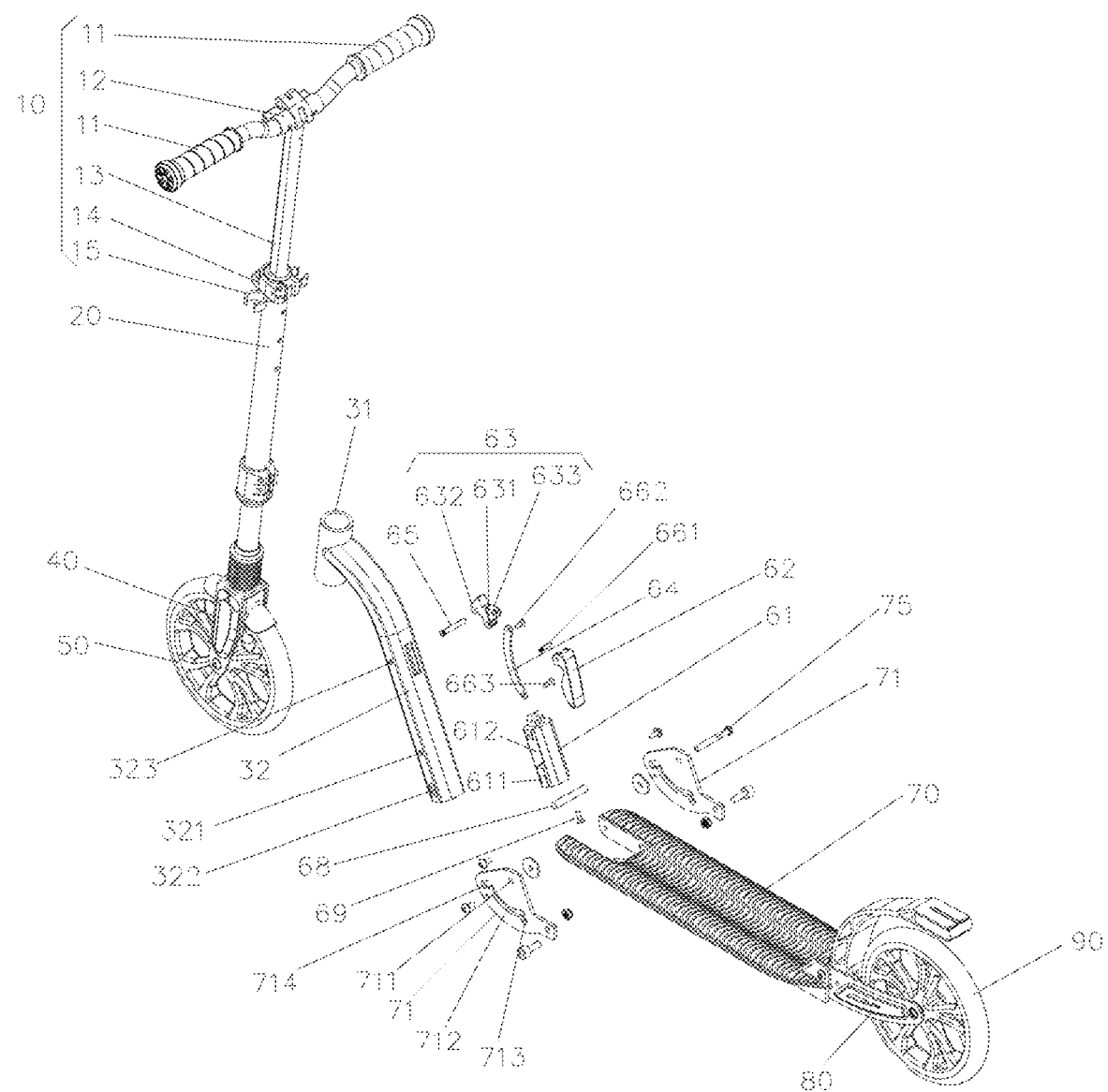
FIG. 3 is a breakdown drawing of a preferable embodiment of the present invention.
Figure 4:
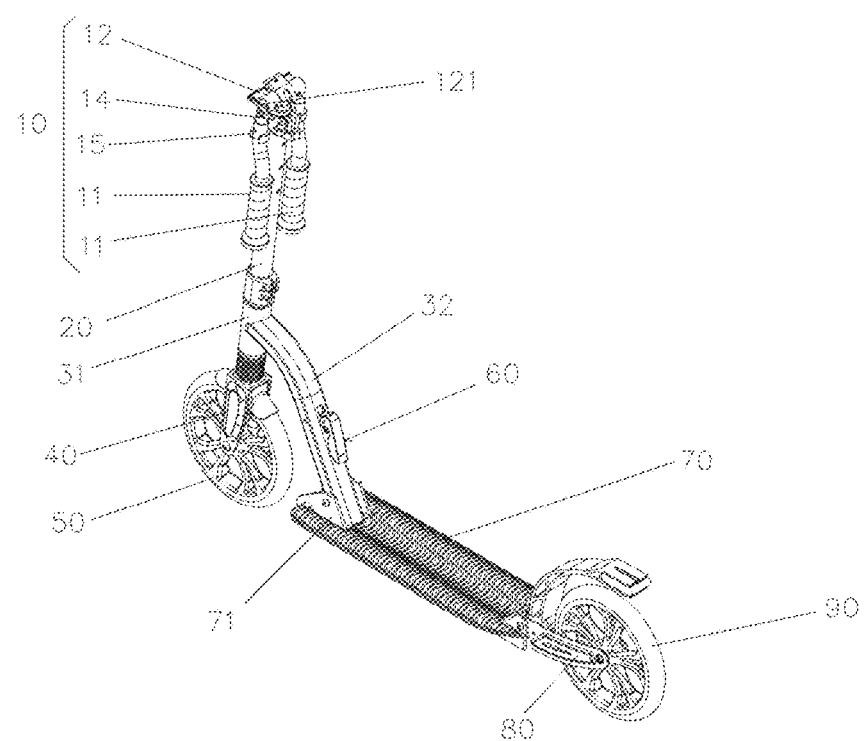
FIG. 4 is a stereogram showing a foldable scooter with its handle assembly detached according to a preferable embodiment of the present invention.

As shown in FIG. 3 and FIG. 4, the handle assembly 10 includes two handlebars 11, a clamping member 12, a supporting rod 13, an urging member 14 and a handlebar holder 15. The supporting rod 13 is inserted within the steering rod 20, and the urging member 14 is disposed around an upper portion of the steering rod 20 and configured to releasably urge the supporting rod 13 so that the supporting rod 13 is adjustable in length. The clamping member 12 is secured to the supporting rod 13, and the two handlebars 11 are detachably secured by the clamping member 12. The handlebar holder 15 is mounted to the steering rod 20, and the handlebar holder 15 includes two clamps configured to hold the two handlebars 11 detached from the clamping member 12 (FIG. 4). As a result, it is good for storage. After the two handlebars 11 are detached from the clamping member 12, a pad 121 is clamped in the clamping member 12.

As shown in FIG. 3, the folding control mechanism 60 includes a slidable member 61, a lever 62, a driving member 63, a linking member 64, a second shaft 65, a first pin 661, a second pin 662, a third pin 663 and a pin member 68. The slidable member 61 includes a through hole 611 at an lower portion thereof, the bracket 32 is a hollow tubular member. Each of the two sides of the bracket 32 further includes an elongate hole 322, the pin member 68 is disposed through the through hole 611, and the slidable member 61 further includes a fastener 69 which is inserted or screwed within the bottom side of the slidable member 61 to position the pin member 68. The slidable member 61 is slidably disposed in the bracket 32. At least one engaging portion 610 is disposed on the slidable member 61, slidable along the guiding groove 712 and releasably blocked within the unfolding positioning slot 713 or releasably blocked within the folding positioning slot 714. The slidable member 61 further includes a main body 613, the pin member 68 is disposed laterally through the main body 613, the main body 613 is slidably disposed in the bracket 32, and two ends of the pin member 68 are protrusive from the main body 613 to form the at least one engaging portion 610. Each of two ends of the pin member 68 (engaging portion 610) is slidably inserted within one said elongate hole 322. The lever 62, the driving member 63 and the linking member 64 form a linkage mechanism to drive the slidable member 61 to move relative to the bracket 32 for a stroke limited by the elongate hole 322. The driving member 63 and the linking member 64 are disposed in the bracket 32, and the lever 62 is disposed outside the bracket 32 and is connected with the driving member 63. Specifically, the driving member 63 includes a driving portion 631, a connecting portion 632 and a lever mounting portion 633. The driving portion 631 is rotatably connected with the linking member 64 by the second pin 662, the linking member 64 is rotatably connected with the slidable member 61 by a third pin 663, and the connecting portion 632 is connected to the bracket 32 by the second shaft 65 which is disposed through two second shaft hole 323 on two sides of the bracket 32. The lever 62 is rotatably connected with the lever mounting portion 633 by the first pin 661.

Figure 5:
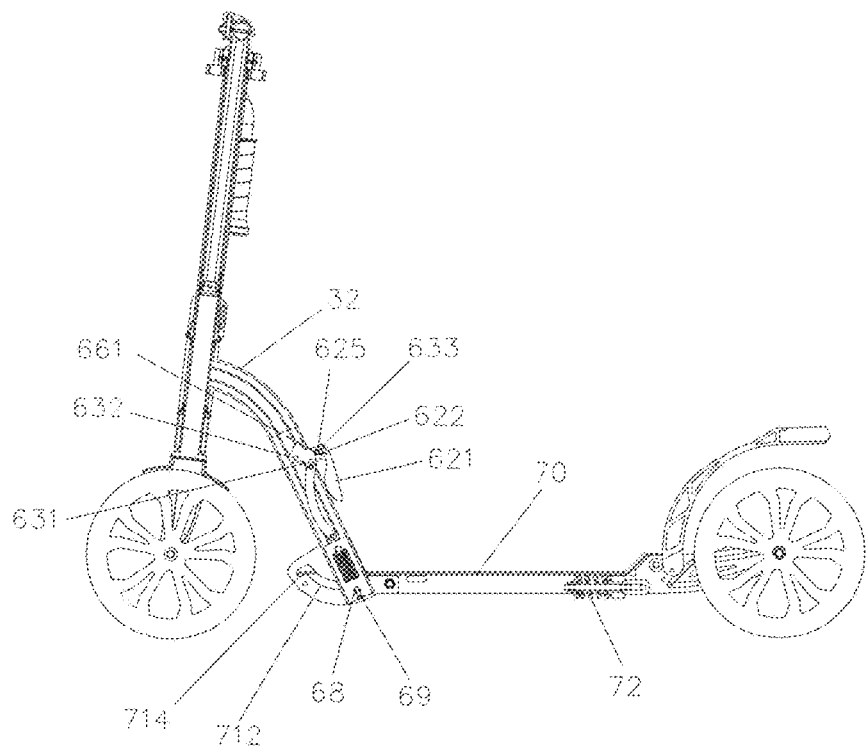
FIG. 5 is a cross-sectional view of FIG. 4.
Figure 6:
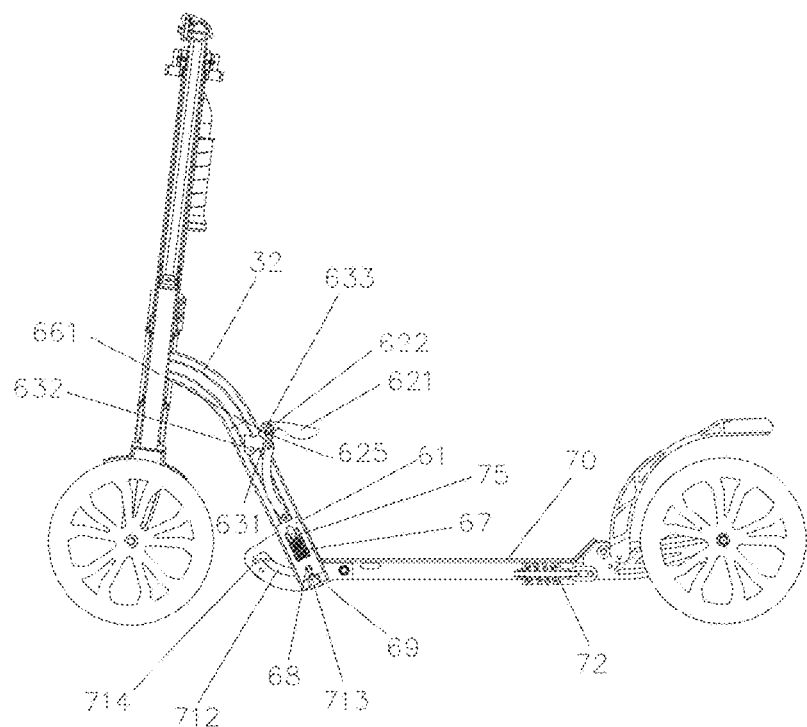
FIGS. 6-9 are cross-sectional views showing operation of a folding control mechanism to fold the foldable scooter according to a preferable embodiment of the present invention.

As shown in FIG. 5 and FIG. 6, the lever 62 includes a lever main body 621 and an abutting portion 622 abutable against the lever mounting portion 633 of other part of the driving member 63 on a rotation direction of the lever 62 to drive the driving member 63. In this embodiment, the lever 62 is freely rotatable relative to the driving member 63 between a first position and a second position so as to provide an idling rotation stroke of the lever 62, and the idling rotation stroke is preferably of traveling for a range about 30 degrees. The idling rotation stroke ensures that the foldable scooter is not folded until the lever 62 is swung over a larger angle (for example, about 90 degrees) to unlock the folding control mechanism 60, which provides most reliable safety in riding the foldable scooter. When the lever 62 is located in the first position, the lever 62 is adjacent to or contacts the bracket 32 and the abutting portion is distanced from the driving member 63 in the rotation direction of the lever 62. When the lever 62 is rotated away from the bracket 32 from the first position to be located in the second position, the lever 62 is abutted against the driving member 63 in the rotation direction of the lever 62, and the driving member 63 is driven to move by the lever 62 as the lever 62 is rotated away from the bracket 32 from the second position. The linkage mechanism further includes a resilient member 625 disposed around the first pin 661 and biasing the lever 62 toward the first position so that the lever 62 contacts the bracket 32.

In this embodiment, the lever 62 is rotated upwardly to drive the driving member 63 to rotate, and the driving member 63 rotates to pull the linking member 64 so as to move the slidable member 61 upwardly so that respective one of two ends of the pin member 68 slides along one said elongate hole 322.

Figure 7:
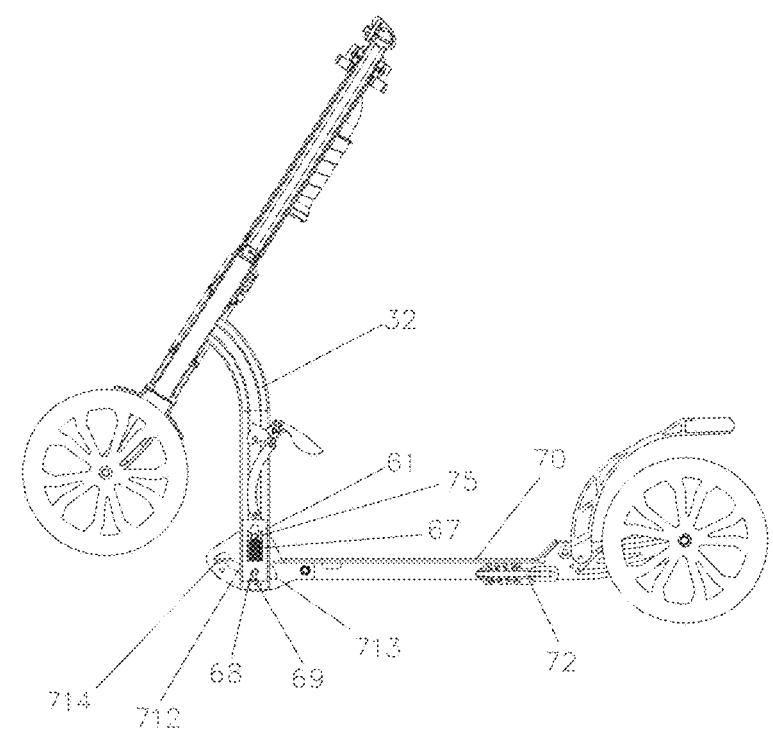
Figure 8:
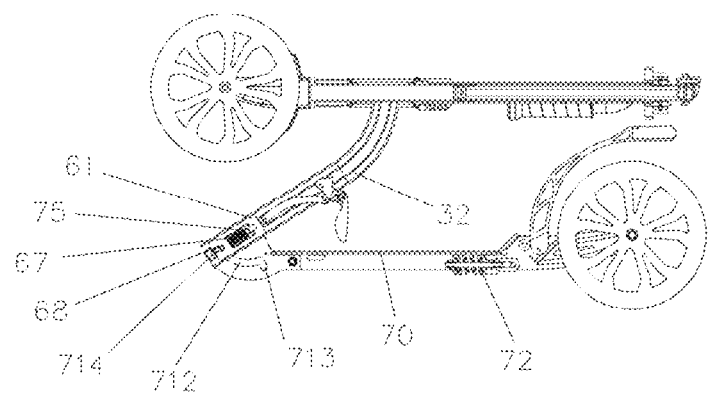
Figure 9:
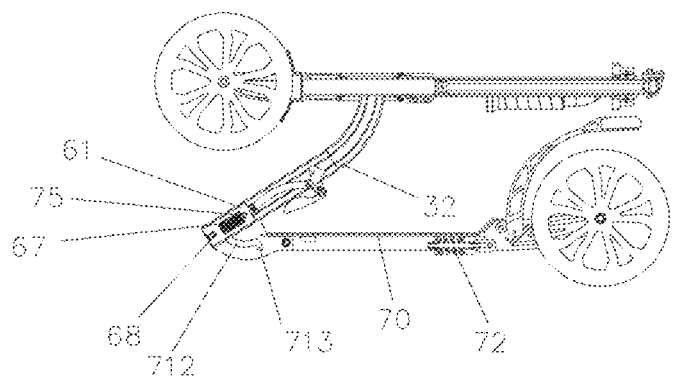
Figure 10:
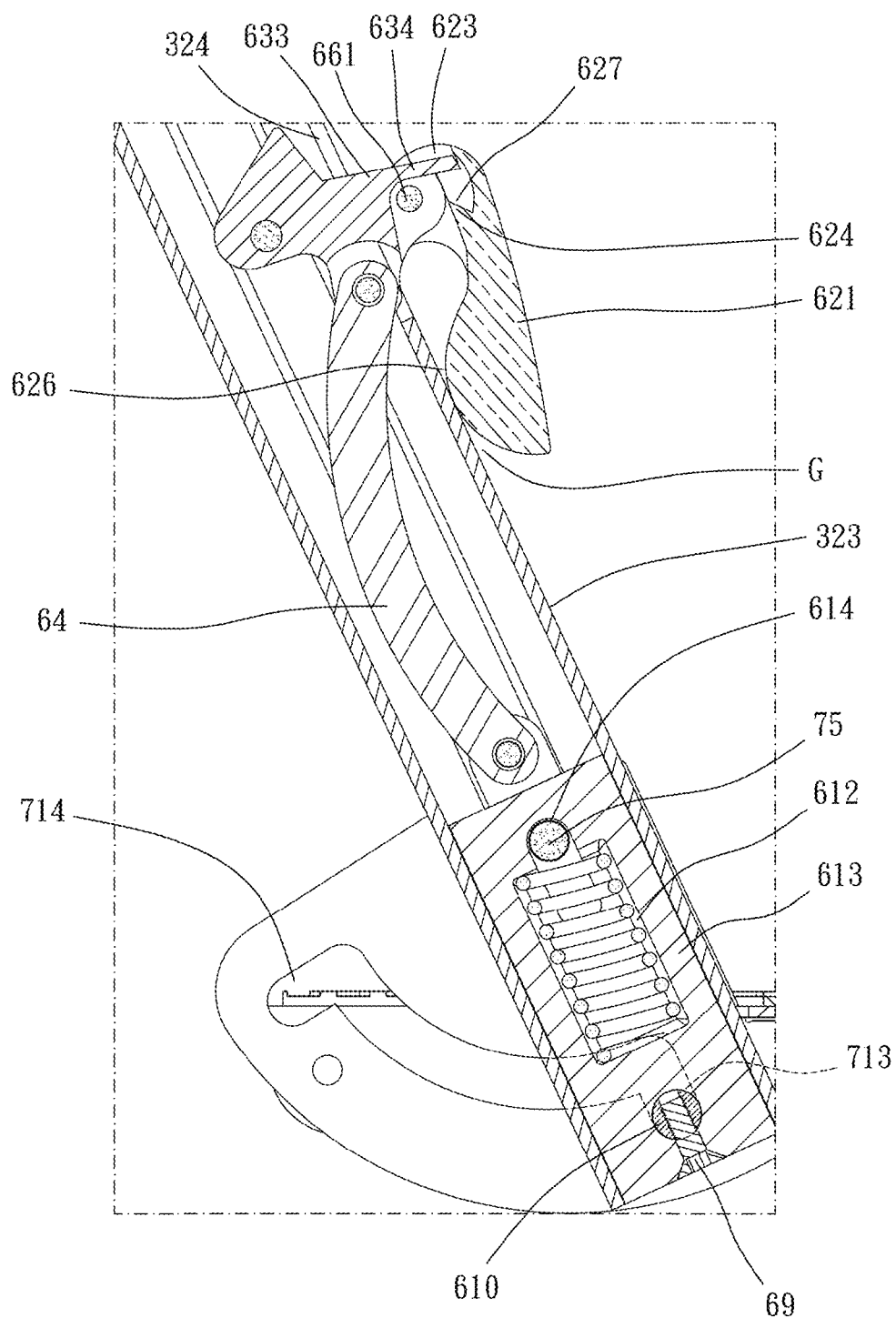
FIGS. 10-13 are partial enlarged cross-sectional views showing operation of a folding control mechanism to fold the foldable scooter according to a preferable embodiment of the present invention.
Figure 13:
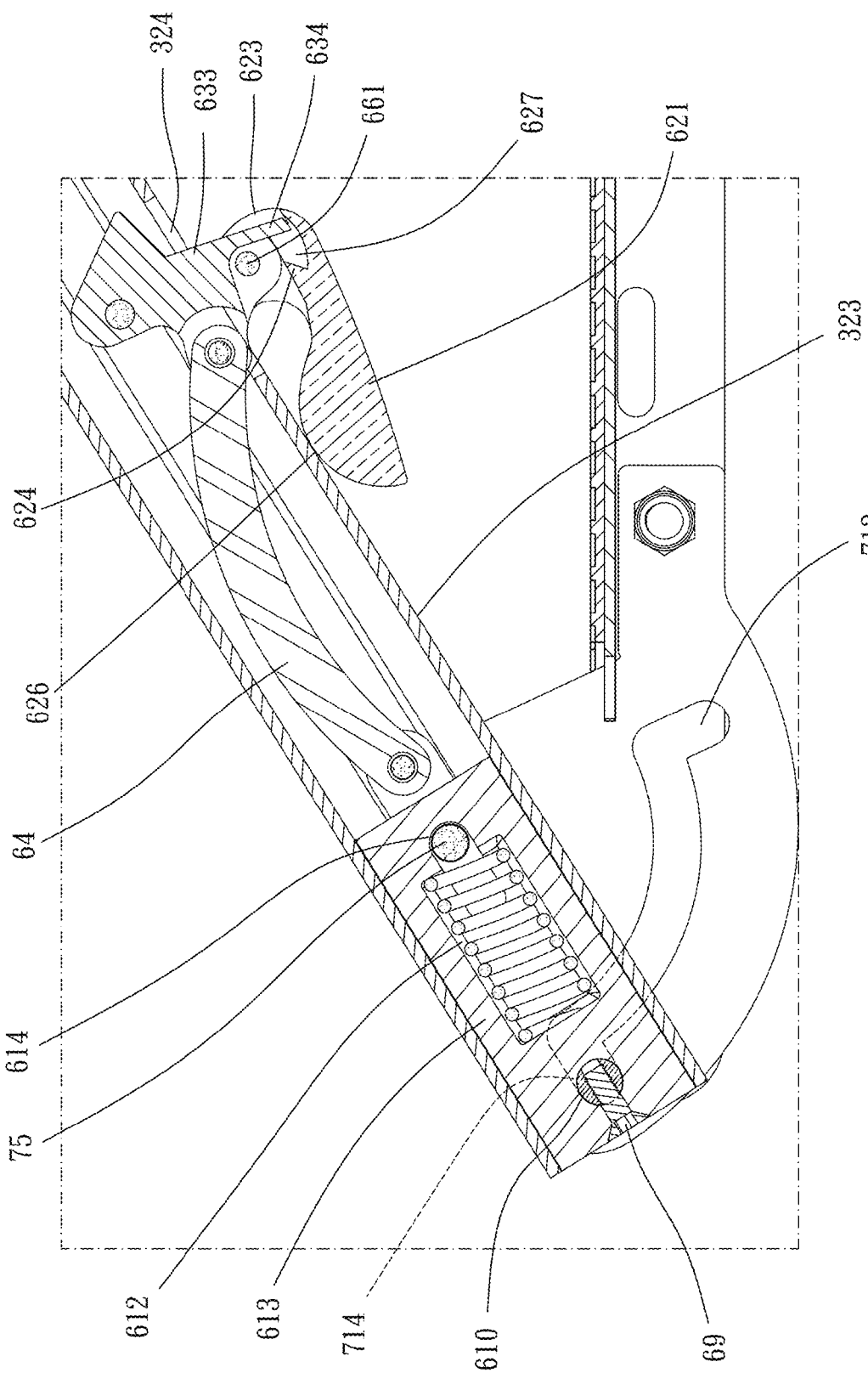

As shown in FIG. 3, each said plate 71 further includes one said guiding groove 712 extending around the first shaft hole 711, and the respective one of two ends of the pin member 68 slides along one said guiding groove 712. Each said guiding groove includes an unfolding positioning slot 713 and a folding positioning slot 714. As shown in FIG. 5, as the foldable scooter is kept in the unfolding state, the pin member 68 (engaging portion 610) is releasably blocked within the unfolding positioning slot 713 (FIG. 10). As shown in FIGS. 6 and 7, to fold the foldable scooter, the lever 62 is rotated to drive the slidable member 61 to move upward so that the pin member 68 is moved to disengage from the unfolding positioning slot 713 and movable along the guiding groove 712, and the foldable scooter can be folded. As shown in FIGS. 8 and 9, as the foldable scooter is kept in the folding state, the pin member 68 is blocked by the slidable member 61 and releasably blocked within the folding positioning slot 714 (FIG. 13). Since the lever 62 is incorporated with the very important safety mechanism (idling rotation stroke), the lever 62 is hardly to be rotated by user's foot over an angle (about 90 degrees) sufficient to disengage the pin member 68 from the folding positioning slot 714. This provides excellent safety for scooter riding.

As shown in FIGS. 3, 5 and 6, in this embodiment, the folding control mechanism 60 further includes an elastic member 67, the slidable member 61 further includes an inner chamber 612 in which the elastic member is disposed, and the first shaft 75 is disposed through the inner chamber 612 so that the slidable member 61 is movable relative to the first shaft 75, and the elastic member 67 is abutted between the first shaft 75 and an inner face of the inner chamber 612. When the slidable member 61 moves upward, the elastic member 67 is compressed (FIGS. 6-8); and when the external force is removed from the slidable member 61, the elastic member 67 urges the slidable member 61 to move downward and return to its original position (FIGS. 5 and 9).

Figure 11:
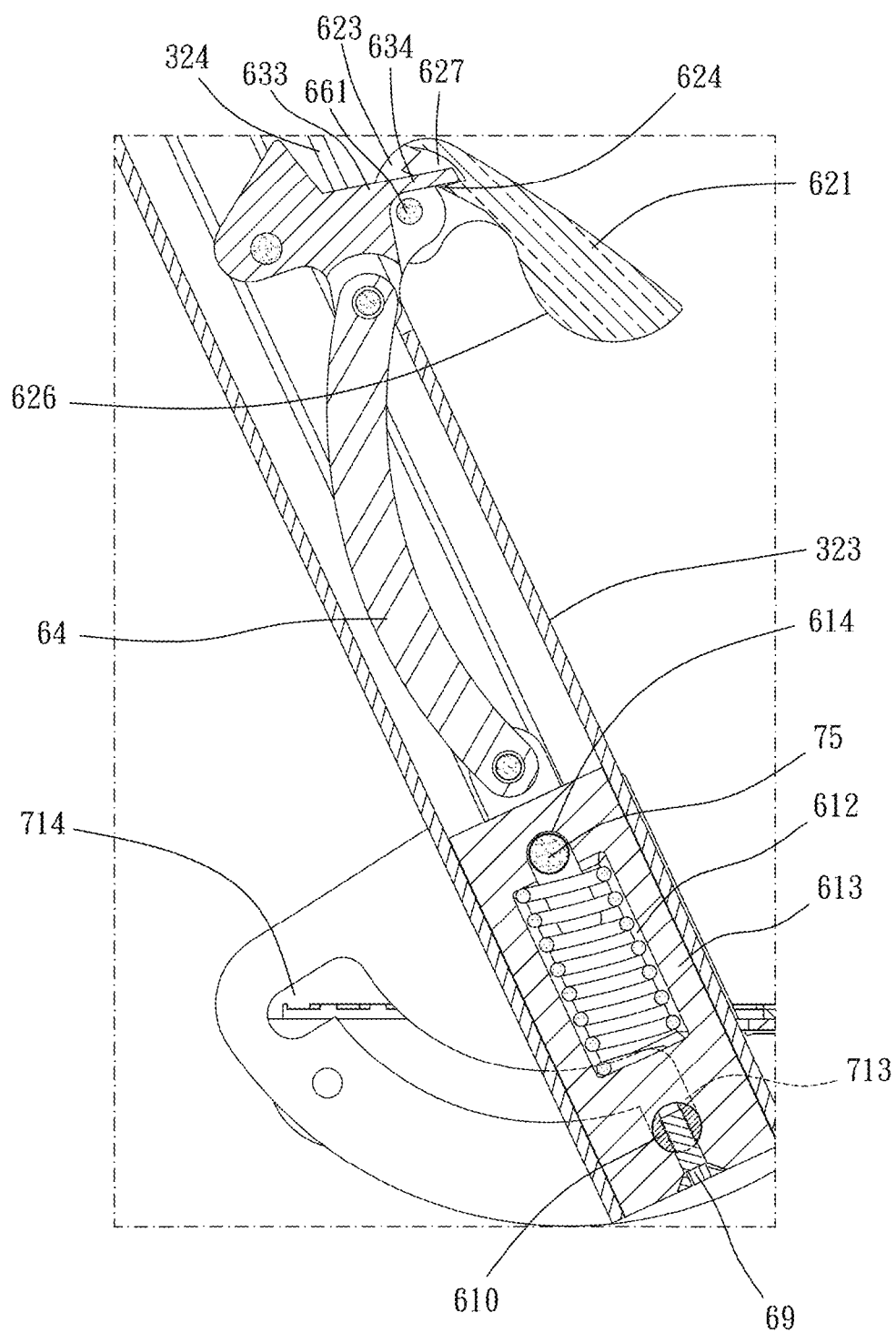
Figure 12:
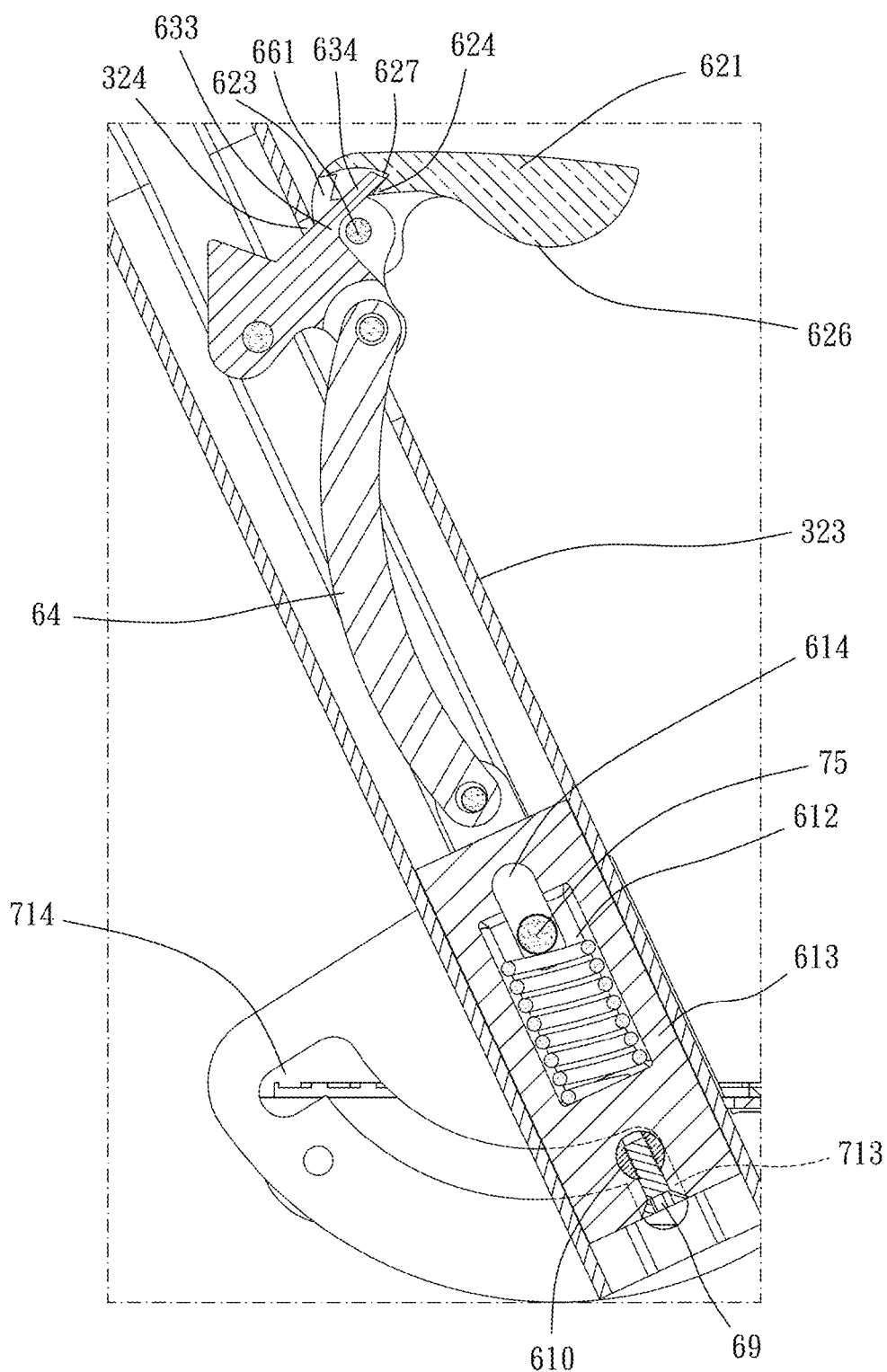

It is noted that the operation of the lever 62 includes two steps. In the first step, the lever 62 is moved to compress the resilient member 625 and completes the idling rotation stroke of the lever 62 (FIGS. 10 and 11), and the abutting portion 622 is abutted against the lever mounting portion 633. In the first step, during the idling rotation stroke the foldable scooter cannot be unlocked and is not foldable, so the user is absolutely safe during riding. In the second step, the lever 62 keeps moving, the driving member 63 is rotated to drive the slidable member 61 to move upward so as to disengage the first shaft 75 from the unfolding positioning slot 713 or the folding positioning slot 714 (FIG. 12). The operation of the lever 62 may be preferably carried out by one foot or by one hand.

Specifically, the lever 62 further includes a notch 623 and a flange 624 which are arranged in interval, the notch 623 receives part of the lever mounting portion 633, and the flange 624 includes the abutting portion 622 and is abutable against the lever mounting portion 633 on the rotation direction of the lever 62 to drive the driving member 63.

The lever main body 621 extends away from the pin member 661, the lever main body 621 includes a convex portion 626 abutable against the side 323 of the bracket 32 facing toward the rear end of the deck body 70, and the pin member 661 and the distal end of the lever main body 621 are located at opposite sides of the convex portion 626. A gap G is formed between a distal end of the lever main body 621 and the side 323 of the bracket 32, which is convenient to operate the lever 62.

A concave 614 is formed on an upper portion of the inner face of the inner chamber 612 and receives the first shaft 75. The side 323 of the bracket 32 includes an opening 324, the linking member 64 extends arcuately, and the driving member 63 and the linking member 64 are partially protrusive out of the bracket 32 via the opening 324 when the lever 62 is located in the second position, which avoiding jamming of the folding control mechanism 60.

The lever 62 further includes a recess 627 between the notch 623 and the flange 624, the lever mounting portion 633 includes a projection 634 projecting within the recess 627, and the flange 624 is abutable against the projection 634 on the rotation direction of the lever to drive the driving member 63. The main body 613 of the slidable member 61 is generally cuboid and has a cross-section corresponding to the tubular bracket 32 in shape, and thus the slidable member 61 can stably move along the tubular bracket 32.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A foldable scooter, including a deck assembly and a steering assembly; the steering assembly including a steering rod, a head tube sleeved around the steering rod and a bracket, the deck assembly including a deck body and a connector connected to a front end of the deck body, the bracket being connected between the head tube and the connector; the connector including at least one guiding groove, each of the at least one guiding groove including an unfolding positioning slot and a folding positioning slot which are arranged in interval; a slidable member being slidably disposed in the bracket, at least one engaging portion being disposed on the slidable member, slidable along the at least one guiding groove and releasably blocked within the unfolding positioning slot or releasably blocked within the folding positioning slot, the foldable scooter further including a linkage mechanism connected to the bracket, connected with the slidable member and configured to release the at least one engaging portion from the unfolding positioning slot or the folding positioning slot; the linkage mechanism including a lever, a driving member and a linking member, the driving member and the linking member being connected to the bracket, the lever being located at a side of the bracket facing toward a rear end of the deck body; the driving member including a driving portion, a connecting portion and a lever mounting portion, the driving portion being connected with the linking member, the linking member being connected with the slidable member; the connecting portion being connected to the bracket by a second shaft, the lever being rotatably connected to the lever mounting portion, the lever being freely rotatable relative to the driving member between a first position and a second position so as to provide an idling rotation stroke of the lever; the lever including an abutting portion abutable against the driving member on a rotation direction of the lever to drive the driving member;
wherein when the lever is located in the first position, the lever is adjacent to the bracket and the abutting portion is distanced from the driving member in the rotation direction of the lever and the at least one engaging portion is releasably blocked within the unfolding positioning slot or releasably blocked within the folding positioning slot; when the lever is rotated away from the bracket from the first position to be located in the second position, the lever is abutted against the driving member in the rotation direction of the lever and the driving member is driven to move by the lever as the lever is rotated away from the bracket from the second position, and the at least one engaging portion is released from the unfolding positioning slot or released from the folding positioning slot.

2. The foldable scooter of claim 1, wherein the connector includes two plates separately and oppositely disposed, each of the two plates includes a first shaft hole, the bracket includes a second shaft hole, and a first shaft is disposed through the slidable member, each said first shaft hole and the second shaft hole.

3. The foldable scooter of claim 1, wherein the lever is rotatably connected to the lever mounting portion by a pin member, and the linkage mechanism further includes a resilient member disposed around the pin member and biasing the lever toward the first position so that the lever contacts the bracket.

4. The foldable scooter of claim 2, wherein the slidable member includes an inner chamber in which an elastic member is disposed, and the first shaft is disposed through the inner chamber so that the slidable member is movable relative to the first shaft, and the elastic member is abutted between the first shaft and an inner face of the inner chamber.

5. The foldable scooter of claim 1, wherein the connector includes two plates separately and oppositely disposed, each of the two plates includes one said guiding groove, and the at least one engaging portion is protrusive from two sides of the slidable member.

6. The foldable scooter of claim 1, wherein the steering assembly further includes a handle assembly, the handle assembly includes two handlebars, a supporting rod and an urging member; the two handlebars are mounted to an upper portion of the supporting rod, the supporting rod is inserted within the steering rod, the urging member is disposed around an upper portion of the steering rod and configured to releasably urge the supporting rod.

7. The foldable scooter of claim 6, wherein the handle assembly further includes a clamping member, the clamping member is secured to the supporting rod, and the two handlebars are detachably secured by the clamping member.

8. The foldable scooter of claim 7, wherein the handle assembly further includes a handlebar holder mounted to the steering rod, and the handlebar holder includes two clamps configured to hold the two handlebars detached from the clamping member.

9. The foldable scooter of claim 1, wherein the lever is rotatably connected to the lever mounting portion by a pin member, the lever further includes a notch and a flange which are arranged in interval, the notch receives part of the lever mounting portion, the flange includes the abutting portion and is abutable against the lever mounting portion on the rotation direction of the lever to drive the driving member.

10. The foldable scooter of claim 9, wherein the lever further includes a lever main body extending away from the pin member, the lever main body includes a convex portion abutable against the side of the bracket facing toward the rear end of the deck body, a gap is formed between a distal end of the lever main body and the side of the bracket facing toward the rear end of the deck body, and the pin member and the distal end of the lever main body are located at opposite sides of the convex portion.

11. The foldable scooter of claim 1, wherein the driving portion is rotatably connected with the linking member by a pin member.

12. The foldable scooter of claim 1, wherein the linking member is rotatably connected with the slidable member by a pin member.

13. The foldable scooter of claim 1, wherein the slidable member includes a main body and a pin member disposed laterally through the main body, the main body is slidably disposed in the bracket, and two ends of the pin member are protrusive from the main body to form the at least one engaging portion.

14. The foldable scooter of claim 13, wherein the slidable member further includes a fastener which is inserted within the main body and positions the pin member.

15. The foldable scooter of claim 14, wherein the fastener is inserted within the pin member.

16. The foldable scooter of claim 13, wherein the bracket is a hollow tubular member, each of two sides of the bracket further includes an elongate hole, and the pin member is slidably inserted within each said elongate hole.

17. The foldable scooter of claim 4, wherein a concave is formed on the inner face of the inner chamber and receives the first shaft.

18. The foldable scooter of claim 1, wherein the side of the bracket facing toward the rear end of the deck body includes an opening, the linking member extends arcuately, and the driving member and the linking member are partially protrusive out of the bracket via the opening when the lever is located in the second position.

19. The foldable scooter of claim 9, wherein the lever further includes a recess between the notch and the flange, the lever mounting portion includes a projection projecting within the recess, and the flange is abutable against the projection on the rotation direction of the lever to drive the driving member.

20. The foldable scooter of claim 13, wherein the bracket is a tubular member, and the main body is generally cuboid and has a cross-section corresponding to the tubular member in shape.

\* \* \* \* \*